Figure 1:
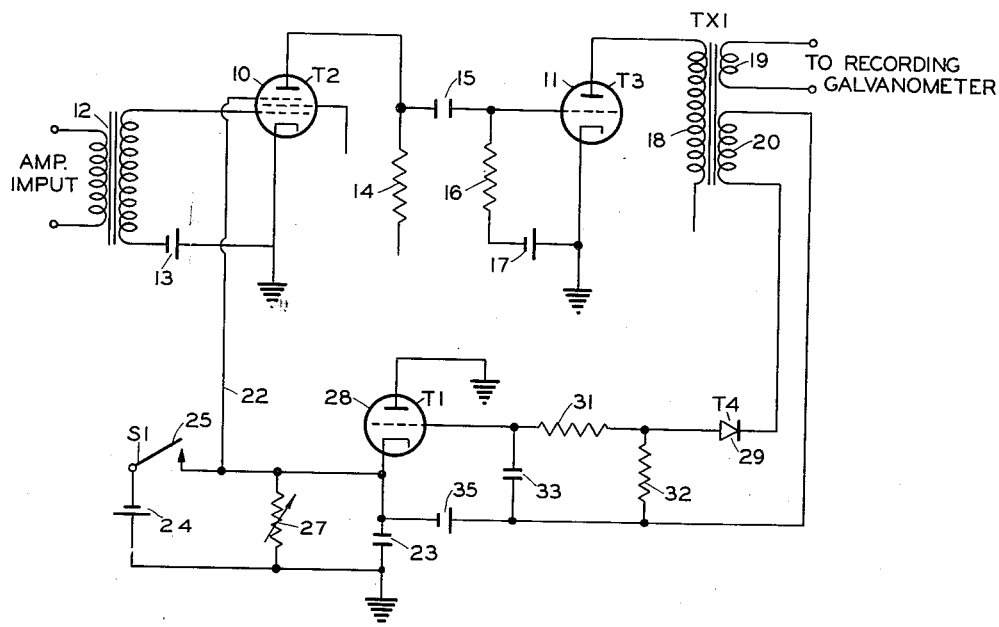

April 1, 1952     A. E. TILLEY     2,591,637
AUTOMATIC VOLUME CONTROL CIRCUIT
Filed April 29, 1949     2 SHEETS—SHEET 1

INVENTOR.
A.E. TILLEY
BY Hudson & Young
by: L. Malcolm Berlin
ATTORNEYS

Patented Apr. 1, 1952

2,591,637

UNITED STATES PATENT OFFICE 2,591,637

AUTOMATIC VOLUME CONTROL CIRCUIT

Aubra E. Tilley, Bartlesville, Okla., assignor to Phillips Petroleum Company, a corporation of Delaware Application April 29, 1949, Serial No. 90,478

5 Claims. (Cl. 179—171)

This invention relates to an automatic volume control circuit which is particularly adapted for use in seismic amplifiers. In another aspect, it relates to an amplifier embodying such an automatic volume control circuit.

In a seismograph recording system, an explosive charge is detonated at a shot point and the resulting seismic waves are picked up by a number of seismometers at preselected locations, these seismometers producing electrical voltages which are representative of the seismic waves. The resulting voltages are fed to a series of seismic amplifiers, and the output of each amplifier is fed to a recording device. The amplitude of the voltages to be recorded is relatively high at the beginning of the recording period, the amplitude thereafter decreasing rapidly during the remainder of the recording period. This necessitates the use of an automatic volume control system in the amplifier in order that the voltages may have proper values for recording purposes throughout the entire recording period.

Heretofore, it has been proposed that the gain of the seismic amplifier be regulated by a condenser connected to a control electrode of one of the amplifier tubes, this condenser being charged at the start of the recording period to impress a negative bias upon the control electrode so as to substantially reduce the amplifier gain. During the recording period, the condenser is discharged through a resistance so that the bias voltage decreases exponentially throughout the recording period with a corresponding increase in amplifier gain. Unfortunately, this system ordinarily requires several trial runs for each location of the seismometers, so that the time constant of the resistance-capacitance circuit may be adjusted to provide a workable relationship between the amplifier gain and the strength of the seismic signals.

It has also been proposed to utilize a standard automatic volume control system in which a portion of the amplifier output is fed back through an automatic volume control circuit to control the gain of a preceding stage of the amplifier. However, oscillations oftentimes occur with this type of circuit unless the time constant of the automatic volume control circuit is long with respect to one cycle of the signal. This condition is a serious limitation in seismic amplifiers since the recording period is very short. Hence, if the automatic volume control system has a long time constant, the controlling action is not sufficiently rapid as to maintain the signal amplitude within the desired limits while, if the time constant is shortened, the circuit may oscillate.

In accordance with the present invention, I retain the advantages of these two methods of automatic volume control while eliminating their disadvantages. This is accomplished by providing a condenser to regulate the amplifier gain in the same manner previously mentioned, this condenser being discharged at a fixed rate throughout the recording period. I also provide means for discharging the condenser at a rapid rate to effect an abrupt increase in amplifier gain when the output signal falls below a predetermined amplitude. This latter discharging means is controlled by the output signal of the amplifier and the circuit may have as short a time constant as desired without causing oscillation, since the output voltage merely controls the discharge rate of a condenser and is not fed back directly to a preceding stage of the amplifier.

Accordingly, it is an object of the invention to provide an improved automatic volume control circuit embodying the principles just mentioned.

It is a further object of this invention to provide an amplifier system embodying such an automatic volume control circuit.

It is a further object of the invention to provide a system which is reliable, rapid in operation, and which can be constructed at low cost from a minimum number of standard circuit components.

Figure 2:
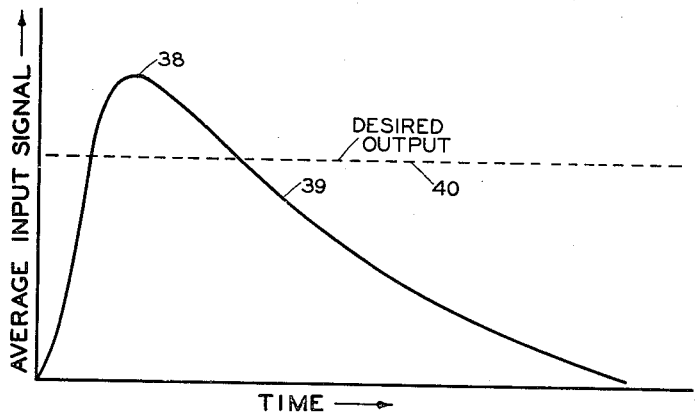
Figure 3:
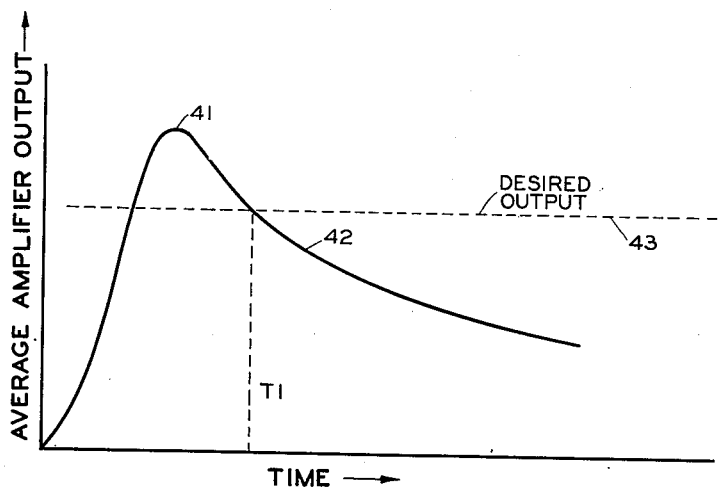
Figure 4:
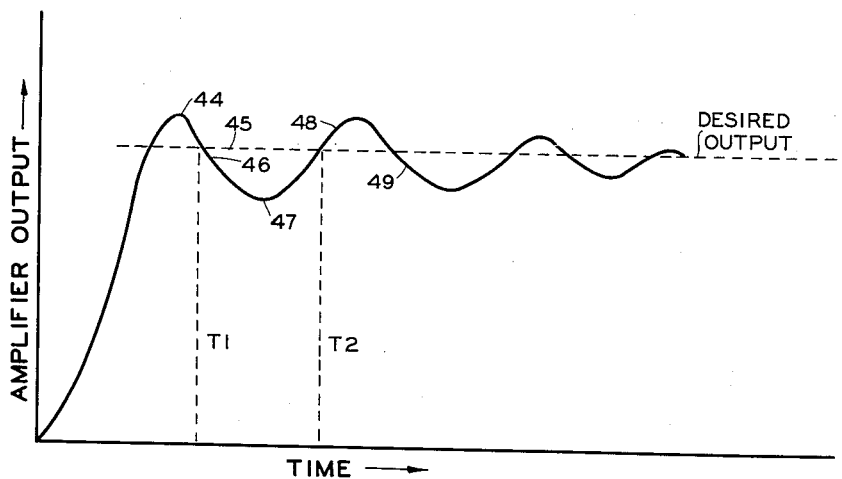

Various other objects, advantages and features of the invention will become apparent from the following detailed description, taken in conjunction with the accompanying drawings, in which:

Figure 1 is a schematic circuit diagram of an amplifier embodying the novel automatic volume control circuit; and Figures 2, 3 and 4 are graphs illustrating features of the invention.

Referring now to the drawings in detail, and particularly to Figure 1, I have shown an amplifier in which a pentode tube 10 feeds a power amplifier tube 11. An input signal, such as a seismic signal, is fed to the amplifier through a transformer 12, the secondary winding of which is connected in circuit with the control grid of tube 10 and a bias battery 13. The anode of tube 10 is resistance coupled to the control grid of tube 11 by a unit including a resistor 14, a condenser 15, and a resistor 16, the latter component being connected in circuit with the control grid of tube 11 and a bias battery 17. The anode of tube 11 is connected in circuit with a primary winding 18 of an output transformer which is provided with secondary windings 19 and 20. The winding 19 supplies the amplifier output to a recording device or other transducer, as desired, and the winding 20 is adapted to supply signal voltage to the automatic volume control system hereinafter described.

The amplifier shown is merely illustrative and various changes and modifications may be made in its circuit provided that the amplifier has an output circuit from which a portion of the signal energy may be fed to the automatic volume control system, and provided that the amplifier gain may be varied by application of a control voltage to the amplifier circuit.

In the present system, the gain of tube 10 is varied by charging a bias voltage applied to the suppressor grid thereof through a conductor 22. If desired, this potential may be applied to another electrode of the tube, such as the control grid, or it may be applied to the amplifier through a system of diodes connected in shunt, as those skilled in the art will readily understand.

The bias voltage is applied to the suppressor grid of tube 10 by a condenser 23, which is connected in circuit with a charging battery 24 and a switch 25, the battery and condenser having the polarities indicated on the figure. In operation of the circuit, the condenser is charged prior to the recording period and switch 25 is automatically opened when the recording period begins. A circuit suitable for accomplishing this purpose is set forth in the copending application of Deslonde R. deBoisblanc and John E. Bondurant, Serial No. 628,310, filed November 13, 1945, entitled "Seismograph Blaster Time Breaker Circuit," which provides apparatus for opening such a switch upon firing of the explosive charge which produces the seismic waves to be measured. When the condenser is fully charged at the beginning of the recording period, a negative potential is impressed upon the suppressor grid of tube 10 which substantially reduces the amplifier gain. During the recording period, condenser 23 discharges through a resistance 27 with the result that the negative bias on the suppressor grid progressively decreases with a corresponding increase in the amplifier gain. The ohmic value of resistor 27 may be varied to control the rate at which the discharge takes place.

In accordance with the invention, condenser 23 is also adapted to discharge through a tube 28, the anode and cathode of which are connected to the respective positive and negative terminals of the condenser, so that the anode is positive with respect to the cathode. The tube 28 is ordinarily non-conductive due to a negative voltage impressed thereon from secondary winding 20 through a rectifier 29 and an averaging circuit including a resistance 31, a resistance 32 and a condenser 33. Responsive to the action of this circuit, a rectified negative voltage is applied to the control grid of tube 28 which is proportional to the average amplitude of the amplifier output signal. A positive potential opposing the described negative potential is also applied to the control grid by a battery 35. The potential of battery 35 is such that the cut off bias on tube 28 is removed and said tube becomes conductive when the rectified signal voltage drops below a selected level whereupon condenser 23 is discharged rapidly through the tube and the amplifier gain is abruptly increased. When the increase in gain raises the average signal amplitude above the aforementioned preselected level, the negative voltage impressed upon tube 28 causes it to become non-conductive and the discharge of condenser 23 therethrough is decreased.

The overall operation of the amplifier circuit may be better understood by reference to Figures 2, 3 and 4. Figure 2 shows the manner in which a typical input signal varies with time. It will be noted that the average signal energy builds up rapidly to a peak amplitude 38 at the start of the recording period and thereafter decreases rapidly during the remainder of the recording period. At the region 39, the signal amplitude falls below the desired output, represented by horizontal line 40 and, thereafter, the signal has insufficient amplitude to properly operate the seismic recording system. Figure 3 shows the manner in which the amplifier output varies with time when condenser 23 and resistor 27 are utilized to regulate the amplifier gain without provision of tube 28 and its associated parts. This method of operation is inherent in many proposed systems of the prior art. In this figure, the output builds up to a peak amplitude 41 and, thereafter, as the signal drops off in accordance with Figure 2, the gain of the amplifier is increased in a compensating manner due to the reduction in negative bias impressed upon the suppressor grid of tube 10 caused by the discharge of condenser 23 through resistance 27. It will be seen that the amplifier output at the region 42 is still substantially lower than the desired output represented by horizontal line 43 but that the decrease is not so abrupt as in Figure 3. After several trials and repeated adjustment of resistance 27, the curve 41, 42 may be made to approximate the desired output 43 more closely but such repeated approximations are, of course, extremely undesirable in seismic work.

In Figure 4, I have illustrated the relationship of amplifier output and time when the automatic volume control circuit of this invention is utilized. It will be noted that the signal reaches a peak amplitude 44 and thereafter decreases in the manner shown by Figure 3 until the desired output level represented by horizontal line 45 is reached; the decreases in signal strength being partially compensated for by the increase in gain resulting from the discharge of condenser 23 through resistor 27. During this period, tube 28 is non-conductive since the signal amplitude is above the desired level 45 and, as a result, the negative voltage impressed upon the control grid of tube 28 from output winding 20 biases the tube beyond cut off. When the average amplifier output falls below the desired value 45, as at 46, the negative bias impressed upon the control grid of tube 28 is decreased and the tube becomes conductive. Thereupon, condenser 23 discharges rapidly through tube 28, the negative voltage impressed upon the suppressor grid of tube 10 by the condenser rapidly decreasing with a resultant abrupt increase in amplifier gain. As a result, the curve reaches a minimum value at 47 and thence the output increases until, at the region 48, it is again above the desired level 45. It will be understood that the output continues to decrease somewhat beyond the region 46 due to the time lag in the averaging circuit, which can be made as small as desired by proper choice of the capacitance of condenser 33 and ohmic value of resistance 31. When the region 48 is reached, the negative amplifier output voltage is sufficient as to drive the grid of tube 28 below its cut off value. Thereupon, tube 28 becomes non-conductive and condenser 23 discharges only through resistance 27 thus reducing the rate at which the amplifier gain is increased. When the decreased amplitude of the signal again brings the amplifier output below the desired level 45, as at the region 49, tube 28 again becomes conductive and a new cycle of operation is initiated.

As a result, the output level of the amplifier oscillates about the desired level 45 and does not depart therefrom to a sufficient extent as to interfere with proper recording and evaluation of the seismic waves. The frequency and amplitude of the oscillations may be controlled by varying the time constant of the averaging circuit 31, 32 and 33 so that the correction of output may be made as rapid or as slow as desired. The oscillations will be of less amplitude when the increase in gain produced by the action of resistance 27 substantially compensates for the decrease in signal strength. It will further be apparent that I have provided an automatic volume control circuit which combines the advantages of the condenser discharge method and feed back method while still permitting use of a circuit having a short time constant, a result which has been unattainable with circuits previously proposed.

While the invention has been described in connection with a present, preferred embodiment thereof, it is to be understood that this invention is illustrative only and is not intended to limit the invention, the scope of which is defined by the appended claims.

Having described my invention, I claim

1. An automatic volume control circuit comprising, in combination, an amplifier, a source of input signal energy, a condenser, a second source of electrical energy for charging said condenser, switching means for removing said second source of electrical energy from said condenser before said input signal is received, a resistance element comprising a first discharge path for said condenser, a grid controlled electron tube comprising a second parallel discharge path for said condenser, circuit means for applying a voltage to the control grid of said electron tube which is proportional to the input signal, and means for regulating the amplified signal in accordance with the charge on said condenser.

2. An automatic volume control system comprising, in combination, an amplifier including an electron tube having a control electrode for regulating its gain, a source of input signal energy, a condenser connected to the control electrode of said tube, a second source of electrical energy for charging said condenser, switching means for removing said second source of electrical energy from said condenser before said input signal is received, a resistance element comprising a first discharge path for said condenser, a grid controlled electron tube comprising a second parallel discharge path for said condenser, and circuit means for applying the output voltage of said amplifier to the control grid of said last-mentioned tube.

3. An automatic volume control system comprising, in combination, a multi-stage amplifier, the first stage including an electron tube having a control electrode for regulating its gain, a subsequent stage of said amplifier having output terminals for withdrawing a portion of the output voltage therefrom, a source of input voltage applied to said amplifier, a condenser connected to the control grid of said first stage tube, a second source of electrical energy for charging said condenser with a voltage of such polarity as to reduce the amplifier gain, switching means for removing said second source of electrical energy from said condenser before said input signal is received, a resistance element comprising a first discharge path for said condenser, a grid controlled electron tube comprising a second parallel discharge path for said condenser, and an averaging circuit actuated by the voltage from said amplifier output terminals for biasing said last-mentioned tube beyond cut off when the input signal is above a predetermined value and for removing said cut off bias when said input signal is below said predetermined value.

4. An automatic volume control system comprising, in combination, a multi-stage amplifier, the first stage including an electron tube having a control electrode for regulating its gain, a subsequent stage of said amplifier having output terminals for withdrawing a portion of the output voltage therefrom, a source of input voltage applied to said amplifier, a condenser connected to the control grid of said first stage tube, a second source of electrical energy for charging said condenser with a voltage of such polarity as to reduce the amplifier gain, switching means for removing said second source of electrical energy from said condenser before said input voltage is received, a resistance element comprising a first discharge path for said condenser, an electron tube having an anode, a cathode, and a control grid comprising a second parallel discharge path for said condenser, said anode being connected to one terminal of said condenser and said cathode being connected to the second terminal of said condenser, and a circuit actuated by the voltage across said output terminals for applying a negative rectified voltage to the control grid of said last-mentioned tube.

5. An automatic volume control system comprising, in combination, an amplifier including a discharge device having a suppressor grid for regulating its gain, a condenser connected to said suppressor grid, a source of electrical energy for charging said condenser to apply a voltage upon said suppressor grid of such polarity as to reduce the amplifier gain, said source of electrical energy being separate from the input signal fed to said amplifier, switching means for removing said source of electrical energy from said condenser before the input signal is received, a resistance path for discharging said condenser to increase the amplifier gain, a second parallel discharge path for said condenser including an electron tube having an anode, a cathode, and a control grid, said condenser being connected in the anode-cathode circuit of said tube, an averaging circuit connected to said control grid, a rectifier feeding said averaging circuit, and circuit means for applying a portion of the amplifier output to said rectifier.

AUBRA E. TILLEY.

REFERENCES CITED

The following references are of record in the file of this patent:

UNITED STATES PATENTS

| Number | Name | Date |
| --- | --- | --- |
| 2,316,354 | Moritz, Jr. | Apr. 13, 1943 |
| 2,352,825 | Fay | July 4, 1944 |
| 2,374,204 | Hoover, Jr. | Apr. 24, 1945 |
| 2,408,001 | Shimek et al. | Sept. 24, 1946 |
| 2,489,126 | Fay et al. | Nov. 22, 1949 |